US009238699B2

(12) United States Patent
Klots et al.

(10) Patent No.: US 9,238,699 B2
(45) Date of Patent: Jan. 19, 2016

(54) STYRENIC (METH)ACRYLIC OLIGOMERS

(71) Applicant: BASF SE, Ludwigshafen (DE)

(72) Inventors: Timothy D. Klots, Plymouth, MI (US); Rafael Galvan, Canton, MI (US); Jon A. Debling, Saline, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/333,929

(22) Filed: Jul. 17, 2014

(65) Prior Publication Data

US 2014/0329960 A1 Nov. 6, 2014

Related U.S. Application Data

(62) Division of application No. 13/250,162, filed on Sep. 30, 2011, now Pat. No. 8,785,548.

(60) Provisional application No. 61/388,930, filed on Oct. 1, 2010.

(51) Int. Cl.

| | |
|---|---|
| *C08F 4/34* | (2006.01) |
| *C08F 8/04* | (2006.01) |
| *C08F 212/08* | (2006.01) |
| *C08F 212/12* | (2006.01) |
| *C09D 125/16* | (2006.01) |
| *C09D 11/106* | (2014.01) |
| *C08F 220/14* | (2006.01) |
| *C09D 11/107* | (2014.01) |
| *C09D 125/14* | (2006.01) |
| *C09D 133/10* | (2006.01) |
| *C08F 220/18* | (2006.01) |
| *C08F 220/32* | (2006.01) |
| *C08F 220/28* | (2006.01) |

(52) U.S. Cl.
CPC ... *C08F 4/34* (2013.01); *C08F 8/04* (2013.01); *C08F 212/08* (2013.01); *C08F 212/12* (2013.01); *C08F 220/14* (2013.01); *C09D 11/106* (2013.01); *C09D 11/107* (2013.01); *C09D 125/14* (2013.01); *C09D 125/16* (2013.01); *C09D 133/10* (2013.01); *C08F 220/32* (2013.01); *C08F 2220/1825* (2013.01); *C08F 2220/1858* (2013.01); *C08F 2220/281* (2013.01); *C08F 2220/325* (2013.01)

(58) Field of Classification Search
CPC .. C09D 125/16; C09D 11/106; C09D 125/14; C09D 133/10; C09D 11/107; C08F 4/34; C08F 8/04; C08F 212/08; C08F 212/12; C08F 220/14; C08F 2220/1825
USPC .......... 524/576, 577, 562; 526/347, 227, 208, 526/204, 212, 216, 318.6, 320, 329.2, 526/317.1; 525/338, 339
See application file for complete search history.

(56) References Cited

U.S. PATENT DOCUMENTS

| | | | |
|---|---|---|---|
| 4,074,032 A | 2/1978 | Naarmann et al. | |
| 4,414,370 A | 11/1983 | Hamielec et al. | |
| 4,529,787 A | 7/1985 | Schmidt et al. | |
| 4,546,160 A * | 10/1985 | Brand et al. | 526/320 |
| 6,984,694 B2 | 1/2006 | Blasius et al. | |
| 8,785,548 B2 | 7/2014 | Klots et al. | |
| 2002/0082371 A1* | 6/2002 | Greenblatt et al. | 526/227 |
| 2002/0111448 A1 | 8/2002 | Greenblatt et al. | |
| 2004/0138381 A1 | 7/2004 | Blasius et al. | |
| 2010/0184941 A1 | 7/2010 | Layman et al. | |

FOREIGN PATENT DOCUMENTS

| | | |
|---|---|---|
| CN | 1257058 | 6/2000 |
| EP | 1 092 757 | 4/2001 |
| FR | 2195642 A1 | 3/1974 |
| JP | 49-075660 | 7/1974 |
| JP | 07-206905 | 8/1995 |
| JP | 2000-198749 | 7/2000 |
| JP | 2005-517061 | 6/2005 |

OTHER PUBLICATIONS

Extended Search Report received in European Patent Application No. 11829996.5-1034 issued Apr. 11, 2014 (6 pages).
Final Office Action received in U.S. Appl. No. 13/250,162 mailed Nov. 29, 2013 (13 pages).
International Preliminary Report on Patentability issued for PCT/US2011/054307 mailed Apr. 11, 2013 (9 pages).
International Search Report and Written Opinion issued for PCT/US2011/054307 mailed Apr. 27, 2012 (13 pages).
Non-Final Office Action received in U.S. Appl. No. 13/250,162 mailed Sep. 12, 2013 (11 pages).
Notice of Allowance received in U.S. Appl. No. 13/250,162 mailed Mar. 14, 2014 (9 pages).
First Office Action received in Chinese Patent Application No. 201180055392.6 issued Jul. 2, 2014, 16 pages with English translation.
Official action received in European Patent Application No. 11829996.5 mailed Oct. 27, 2014, 7 pages.
Office Action received for Japanese Patent Application No. 531929/2013 mailed Aug. 11, 2015, 10 pages with English translation (018894-0420).
*U.S. 2002/0111448 is the English equivalent of JP2000-198749.
**U.S. 2004/0138381 is the English equivalent of JP2005-517061.

* cited by examiner

*Primary Examiner* — Michael M Bernshteyn
(74) *Attorney, Agent, or Firm* — Foley & Lardner LLP

(57) ABSTRACT

Styrenic (meth)acrylic oligomers that are prepared at lower temperature than conventional solid grade oligomers, or are hydrogenated, contain fewer terminal vinylic unsaturations, when compared to such conventional styrenic (meth)acrylic oligomers prepared by the customary high temperature processes. Styrenic (meth)acrylic oligomers that contain fewer terminal vinylic unsaturations demonstrate improved thermal stability and may provide improved resistance to UV weathering compared to the conventional and non-hydrogenated styrenic (meth)acrylic oligomers.

15 Claims, 12 Drawing Sheets

Example 6. TGA overlay of styrene-methacrylate resins of identical composition showing the improved thermal stability for Ex 3A from hydrogenation and Ex 2F from the lower temperature process

STYRENIC (METH)ACRYLIC OLIGOMERS

CROSS-REFERENCE TO RELATED APPLICATIONS

This application is a divisional of U.S. patent application Ser. No. 13/250,162, filed on Sep. 30, 2011, to issue as U.S. Pat. No. 8,785,548 on Jul. 22, 2014, which in turn claims the benefit of U.S. Provisional Patent Application No. 61/388,930, filed on Oct. 1, 2010, the entire disclosures of which are incorporated herein by reference for any and all purposes.

FIELD

The present technology generally relates to process for producing styrenic (meth)acrylic oligomers that exhibit a greater stability than their conventionally produced counterparts. The technology includes low temperature produced (meth)acrylic and styrenic (meth)acrylic oligomers and hydrogenated styrenic (meth)acrylic oligomers, and processes for preparing them.

BACKGROUND

Styrenic (meth)acrylic oligomers prepared by continuous bulk polymerization of vinylic monomers at high temperatures are low molecular weight copolymers which contain some residual, terminal vinylic unsaturation, or carbon-carbon double bonds. Such residual unsaturation may adversely impact the stability and other properties of these oligomers and products and articles made from them. Residual unsaturation may reduce the thermal stability of the styrenic (meth)acrylic oligomers and limit their utility in certain applications that require exposure of these polymers to high temperature conditions.

For example, high glycidyl methacrylate (GMA)-content, styrene-GMA oligomers, which are made under high temperature bulk polymerization conditions, are excellent chain extenders for a number of plastics, such as, polyethylene terephthalate (PET), polylactic acid (PLA), polycarbonate (PC), and PET copolymerized with cyclohexane dimethanol (PETG). However, due to their reduced thermal stability, the styrene-GMA oligomers are not suitable for certain applications that require contact with food.

For applications where styrenic (meth)acrylic oligomers are to be in contact with food, strict guidelines must be met in terms of the presence of residual monomers in the final article. Because of such strict restrictions on residual monomers, polymeric additives should fulfill two basic requirements: they should have very little or no residual monomers to begin with, and have minimal or no generation of monomers and other harmful chemicals during the compounding and making of a final article.

In typical styrene-GMA oligomer applications, small amounts of the oligomers are compounded with the host plastic to make the final articles, such as bottles. Compounding temperatures range from 200° C. to 220° C. for PLA, and can go as high as 270° C. or even higher for PET. The compounding cycle usually lasts for 5 minutes, or less. However, under such conditions, styrene-GMA oligomers may begin degrading. At the high temperatures used for making styrenic (meth)acrylic oligomers, terminal double bonds or terminal vinylic unsaturation are produced. These terminal unsaturations are one of the reasons that such styrenic (meth)acrylic oligomers in general, and the high-GMA containing styrene-GMA oligomers in particular, may be thermally unstable. Conventional styrene-GMA oligomers may start degrading at temperatures in the 200° C. to 250° C. range. Because of the thermal instability of the styrene-GMA oligomers, and their concomitant degradation, their use in products that have direct contact with food products is limited, as well as their use in numerous other applications.

Conventional, high-temperature produced (meth)acrylic oligomers have similar draw-backs, but not necessarily for the same reasons. For example, where the (meth)acrylic oligomer is an acrylic-based oligomer, some amounts of unsaturation may be present, leading to thermal instability as above with respect to the styrene-GMA oligomers. For methacrylate oligomers, little unsaturation is present, however, high-temperatures impart some inherent instability. All methacrylate systems are not polymerized at high temperatures due to the thermodynamics of polymerization but the resulting polymers still have disadvantages when used at high temperatures or under demanding conditions.

The presence of residual unsaturation in conventional styrenic (meth)acrylic and acrylic oligomers may lead to ultraviolet (UV)-light absorption by the oligomers and subsequent degradation of the oligomers or products such as coatings containing these oligomers.

SUMMARY

Processes for the preparation of styrenic (meth)acrylic and (meth)acrylic oligomers are provided, where the oligomers exhibit greater temperature stability in comparison to those made by conventional bulk polymerization processes. Such oligomers are produced by either low temperature polymerizations in comparison with conventional bulk polymerization, or styrene (meth)acrylic oligomers produced via conventional process are modified via hydrogenation processes. Overall, such oligomers are more stable under certain conditions than the conventional oligomers made by the customary high temperature processes or without hydrogenation.

In one aspect, a process is provided for preparing an oligomer by continuously charging into a reactor a mixture including a vinylic monomer including a styrenic monomer, a (meth)acrylic monomer, or a mixture of such vinylic monomers, up to 5 wt % of a polymerization initiator, and from 5 wt % to 80 wt % of a reaction solvent; maintaining the resin mixture at a reaction temperature of from 120° C. to 165° C.; and isolating the oligomer from the resin mixture; where the oligomer has an insubstantial amount of olefinic unsaturation. In some embodiments, the oligomer is characterized by an absence of a significant IR absorption in the range of 1645 $cm^{-1}$ to 1610 $cm^{-1}$. In some embodiments, the oligomer is characterized by an absence of a significant resonance in the range of 4.5 to 5.5 ppm in the $^1H$ NMR, referenced to tetramethylsilane.

In some embodiments, the vinylic monomer includes a styrenic monomer and a (meth)acrylic monomer. In some embodiments, the (meth)acrylic monomer includes ethyl acrylate, methyl (meth)acrylate, butyl (meth)acrylate, 2-ethylhexyl (meth)acrylate, hydroxyethyl (meth)acrylate, glycidyl (meth)acrylate, or acrylic acid (AA). In some embodiments, the styrenic monomer includes styrene or α-methylstyrene. In some embodiments, the vinylic monomer includes from 40 to 65 wt % of the styrenic monomer; and from 35 to 60 wt % of the (meth)acrylic monomer. In some embodiments, the polymerization initiator is an azo compound, a peroxide, or a mixture of any two or more such initiators.

In some embodiments, a residence time of the reaction mixture is from 5 minutes to 60 minutes.

In some embodiments, the oligomer has a number average molecular weight ($M_n$) of 1,000 g/mol to 10,000 g/mol. In some embodiments, the oligomer has a weight average molecular weight ($M_w$) of 1,500 g/mol to 30,000 g/mol.

In another aspect, a styrenic (meth)acrylic oligomer is produced by a continuous polymerization process including: charging into a reactor a mixture including a styrenic monomer, a (meth)acrylic monomer, and up to 5 wt % of a polymerization initiator; maintaining the mixture at a temperature from 175° C. to 300° C.; separating the styrenic (meth)acrylic oligomer from the mixture; and hydrogenating the styrenic (meth)acrylic oligomer; where the styrenic (meth)acrylic oligomer has an insubstantial amount of olefinic unsaturation. In some embodiments, the hydrogenating includes contacting the styrenic (meth)acrylic oligomer with hydrogen and a hydrogenation catalyst.

In some embodiments, the styrenic (meth)acrylic oligomer is characterized by an absence of a significant IR absorption in the range of 1645 cm$^{-1}$ to 1610 cm$^{-1}$. In some embodiments, the styrenic (meth)acrylic oligomer is characterized by an absence of a significant resonance in the range of 4.5 to 5.5 ppm in the $^1$H NMR, referenced to tetramethylsilane.

In some embodiments, the (meth)acrylic monomer includes ethyl acrylate, methyl (meth)acrylate, butyl (meth)acrylate, 2-ethylhexyl (meth)acrylate, hydroxyethyl (meth)acrylate, glycidyl (meth)acrylate, or (meth)acrylic acid. In some embodiments, the styrenic monomer includes styrene or α-methylstyrene. In some embodiments, the mixture includes from 40 to 65 wt % of the styrenic monomer; and from 35 to 60 wt % of the (meth)acrylic monomer.

In some embodiments, the styrenic (meth)acrylic oligomer has a number average molecular weight ($M_n$) of 1,000 g/mol to 10,000 g/mol. In some embodiments, the styrenic (meth)acrylic oligomer has a weight average molecular weight ($M_w$) of 1,500 g/mol to 30,000 g/mol.

In another aspect, any of the above oligomers may be used in printing inks, surface coatings, or overprint varnishes, or as pigment dispersants, or in chain extended polymeric compositions. In another aspect, an article made from any of the above oligomers is provided. In one embodiment, the article is used in direct contact with food. For example, the article may be used in food contact applications where the article may be exposed to temperatures of up to 250° C.

In another aspect, a polymeric composition is provided including any of the above oligomers as a flow modifier, compatibilizer, plasticizer, reactive plasticizer, stress releasing agent, or dispersant. In another aspect, a plastic article is provided including any of the above oligomers as a sheet, a film, a foam, a bottle, or an extrusion coating. In another aspect, any of the above oligomers may be included in a chain extended composition which also includes a biodegradable plastic, polyethylene terephthalate, poly(lactic) acid, poly(glycolic) acid, poly(lactic-glycolic) acid, polyhydroxybutyrate, or polyhydroxybutyrate-co-valerate.

Any of the above oligomers or styrenic (meth)acrylic oligomers may be combined with a carrier to produce a masterbatch compound. The masterbatch compound may include from about 10 wt % to about 50 wt % of the oligomer or styrenic (meth)acrylic oligomer. In some embodiments, the oligomer or styrenic (meth)acrylic oligomer is present in the masterbatch from about 15 wt % to about 35 wt %. The carrier may be a reactive or non-reactive carrier.

In another aspect, a composition is provided including a styrenic oligomer, a (meth)acrylic oligomer, or a styrenic (meth)acrylic oligomer, the composition exhibiting a Δb* value, after no less than 500 hours of exposure of the composition to UV testing, that is less than a Δb* value for a composition including a conventionally prepared styrenic oligomer, a (meth)acrylic oligomer, or a styrenic (meth)acrylic oligomer that was subjected to the same UV testing. For example, the UV may be as described below in the examples. In one embodiment, the UV testing is a QUV A test includes irradiation cycles of 4 hours on followed by 4 hours off of a 340 bulb at 0.89 irradiance at 50° C. The UV test may also be a UV-B test or a weatherometer test. In one embodiment, the styrenic oligomer, (meth)acrylic oligomer, or styrenic (meth)acrylic oligomer is produced by a process including continuously charging into a reactor a mixture including: about 20 wt % to about 80 wt % of a vinylic monomer, the vinylic monomer including a styrenic monomer, a (meth)acrylic monomer, or a mixture thereof; about 0.25 wt % to about 5 wt % of a polymerization initiator; and about 20 wt % to about 80 wt % of a reaction solvent; maintaining the reactor at a temperature of from about 120° C. to about 165° C. to produce the styrenic oligomer, (meth)acrylic oligomer, or styrenic (meth)acrylic oligomer; and isolating the oligomer; wherein: the oligomer has an insubstantial amount of olefinic unsaturation. In one embodiment, the composition includes a hydrogenated styrenic (meth)acrylic oligomer produced by a process including: continuously charging into a reactor a mixture including: a styrenic monomer; a (meth)acrylic monomer; and from about 0.25 wt % to about 5 wt % of a polymerization initiator; maintaining the mixture at a temperature from about 175° C. to about 300° C.; separating a styrenic (meth)acrylic oligomer from the mixture; and hydrogenating the styrenic (meth)acrylic oligomer; wherein: the styrenic (meth)acrylic oligomer has an insubstantial amount of olefinic unsaturation.

DETAILED DESCRIPTION

Figure 1:
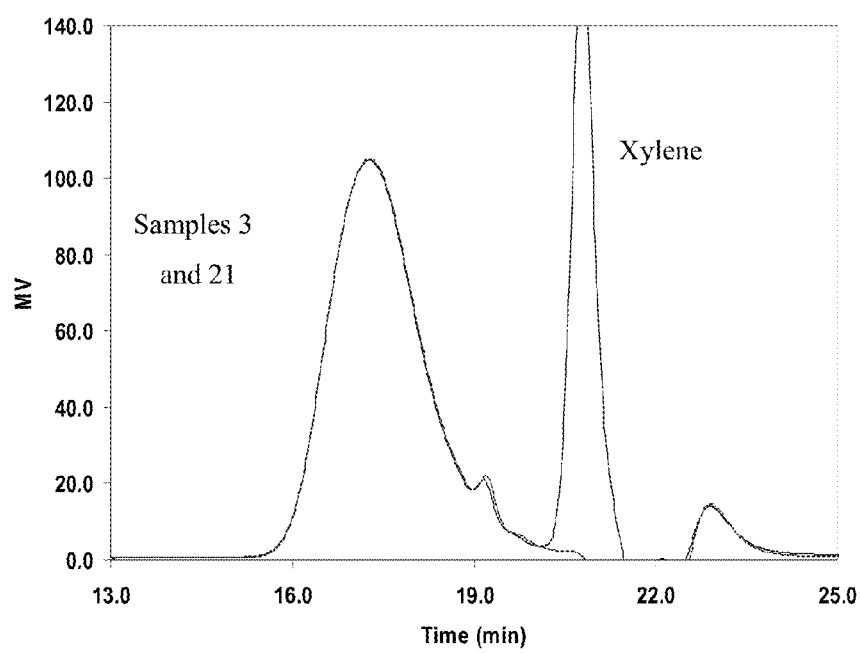
FIG. 1 is a gel permeation chromatogram (GPC) for high temperature produced product in comparison to its hydrogenated analogue, according to the examples.

The following definitions apply:

As used herein, "(meth)acrylic monomers" refer to acrylic or methacrylic acid, esters of acrylic or methacrylic acid, and salts, amides, and other suitable derivatives of acrylic or methacrylic acid, and mixtures thereof. Examples of suitable acrylic monomers include, without limitation, the following methacrylate esters: methyl methacrylate, ethyl methacrylate, n-propyl methacrylate, n-butyl methacrylate (BMA), isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate (GMA), benzyl methacrylate, allyl methacrylate, 2-n-butoxyethyl methacrylate, 2-chloroethyl methacrylate, sec-butyl-methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate. Example of suitable acrylate esters include, without limitation, methyl acrylate, ethyl acrylate, n-propyl acrylate, isopropyl acrylate, n-butyl acrylate (BA), n-decyl acrylate, isobutyl acrylate, n-amyl acrylate, n-hexyl acrylate, isoamyl acrylate, 2-hydroxyethyl acrylate, 2-hydroxypropyl acrylate, N,N-dimethylaminoethyl acrylate, N,N-diethylaminoethyl acrylate, t-butylaminoethyl acrylate, 2-sulfoethyl acrylate, trifluoroethyl acrylate, glycidyl acrylate, benzyl acrylate, allyl acrylate, 2-n-butoxyethyl acrylate, 2-chloroethyl acrylate, sec-butyl-acrylate, tert-butyl acrylate, 2-ethylbutyl acrylate, cinnamyl acrylate, crotyl acrylate, cyclohexyl acrylate, cyclopentyl acrylate, 2-ethoxyethyl acrylate, furfuryl acrylate, hexafluoroisopropyl acrylate, methallyl acrylate, 3-methoxybutyl acrylate, 2-methoxybutyl acrylate, 2-nitro-2-methylpropyl acrylate, n-octylacrylate, 2-ethylhexyl acrylate, 2-phenoxyethyl acrylate, 2-phenylethyl acrylate, phenyl acrylate, propargyl acrylate, tetrahydrofurfuryl acrylate and tetrahydropyranyl acrylate.

Examples of other suitable acrylic monomers include, without limitation, methacrylic acid derivatives such as: methacrylic acid and its salts, methacrylonitrile, methacrylamide, N-methylmethacrylamide, N-ethylmethacrylamide, N,N-diethylmethacrylamide, N,N-dimethylmethacrylamide, N-phenylmethacrylamide and methacrolein. Examples of acrylic acid derivatives include, without limitation, acrylic acid and its salts, acrylonitrile, acrylamide, methyl α-chloroacrylate, methyl 2-cyanoacrylate, N-ethylacrylamide, N,N-diethylacrylamide and acrolein.

Examples of certain other suitable acrylic or methacrylic acid derivatives include, without limitation, those containing cross-linkable functional groups, such as hydroxy, carboxyl, amino, isocyanate, glycidyl, epoxy, allyl, and the like.

Examples of hydroxy functional monomers include, without limitation, hydroxyalkyl acrylates and methacrylates such as 2-hydroxyethyl acrylate (HEA), 3-chloro-2-hydroxypropyl acrylate, 2-hydroxy-butyl acrylate, 6-hydroxyhexyl acrylate, 2-hydroxymethyl methacrylate (HMMA), 2-hydroxypropyl methacrylate (HPMA), 6-hydroxyhexyl methacrylate, and 5,6-dihydroxyhexyl methacrylate.

"Cross-linkable" styrenic (meth)acrylic oligomers refer to styrenic (meth)acrylic oligomers that are thermosetting and have functional groups which are cross-linked by heating with a cross-linking agent. The polymers contain sufficient functional group containing monomers, such as monomers containing cross-linkable functional groups, to allow cross-linking of the polymers.

For example, a cross-linkable styrenic (meth)acrylic oligomer may contain from about 10% to about 80% by weight of a styrenic monomer, from about 10% to about 50% by weight of an alkyl ester of acrylic or methacrylic acid and from about 20% to about 50% by weight of a hydroxyalkyl acrylate or alkyl methacrylate. The styrenic monomer may be styrene and/or α-methyl styrene. The alkyl ester of acrylic or methacrylic acid has alkyl groups having from one to eight carbon atoms and includes, for example and without limitation, the methyl, ethyl, propyl, butyl, isobutyl, isoamyl, 2-ethylhexyl and octyl, acrylates and methacrylates.

The hydroxyalkyl acrylates and methacrylates may contain an alkylene group having from 2 to 6 carbon atoms to which the hydroxy group is attached. Examples of these monomers are hydroxyethyl acrylate or methacrylate, hydroxypropyl acrylate or methacrylate and hydroxyhexyl acrylate or methacrylate. Other copolymerizable monomers can also be utilized. Examples of thermosetting polymers include, without limitation, terpolymers, such as styrene/2-ethylhexyl acrylate/hydroxyethyl methacrylate, styrene/methyl methacrylate/hydroxyethyl methacrylate and styrene/butyl acrylate/hydroxyethyl methacrylate. The styrenic monomers are employed in amounts from about 20% to about 50% by weight, the alkyl esters of acrylic or methacrylic acid are employed in amounts from about 10% to about 40% by weight, and the hydroxy monomers are employed in amounts from about 20% to about 50% by weight.

Examples of curing or cross-linking agents which may be utilized for cross-linking the polymeric products include, without limitation, polyepoxides, polyisocyanates, urea-aldehyde, benzoguanamine aldehyde, melamine-aldehyde condensation products and the like. Examples of melamine-formaldehyde condensation products that act as crosslinking agent include, without limitation, polymethoxymethyl melamines such as hexamethoxymethylmelamine. When melamine-formaldehyde or urea-formaldehyde crosslinking agents are utilized, an acid catalyst, such as toluene sulfonic acid, may be employed to increase the crosslinking rate. Typically, these cross-linking agents are products of reactions of melamine or urea, with formaldehyde and various alcohols containing up to and including 4 carbon atoms.

Cross-linking agents also include those sold under the trademark "Cymel." Without limitation, Cymel 301, Cymel 303 and Cymel 1156, which are alkylated melamine-formaldehyde resins, are useful cross-linking agents.

"Epoxy functionalized styrene (meth)acrylic copolymer" refers to an styrenic (meth)acrylic oligomer including acrylic monomers including glycidyl methacrylate and other (meth) acrylic monomers containing epoxy groups.

"Ethylenic monomers" refer to, vinyl acetate, vinyl pyridine, vinyl pyrrolidone, sodium crotonate, methyl crotonate, crotonic acid, maleic anhydride, and the like.

"Hydrogenation" refers to chemically adding a hydrogen molecule to a compound. Olefinic or carbon-carbon double bonds (C=C) can be hydrogenated or undergo hydrogenation. While a variety of hydrogen sources can be employed for hydrogenation, a convenient source is molecular hydrogen. A variety of catalysts are useful to catalyze hydrogenations. Examples of catalysts include, without limitation, Pt, Pd, $PtO_2$, $Pd(OH)_2$, Rh, and many other suitable heavy metals dispersed on a variety of supports. Suitable supports include, without limitation, carbon, charcoal, alumina, and the like. Hydrogenations can be performed using hydrogen at atmospheric pressure and at higher pressures.

"Hydrogenated styrenic (meth)acrylic oligomer" refers to an styrenic (meth)acrylic oligomer that contains a lower level of unsaturation or fewer carbon-carbon double bonds than that present in an styrenic (meth)acrylic oligomer obtained from vinylic monomers via a bulk polymerization process. In a hydrogenated styrenic (meth)acrylic oligomer, many of the terminal double bonds present in a styrenic (meth)acrylic oligomer are hydrogenated; and other than that difference, the hydrogenated styrenic (meth)acrylic oligomer typically has the same constituent monomers as a corresponding non-hydrogenated styrenic (meth)acrylic oligomer. The terminal C=C bonds absorb UV radiation in the range from 240 nm to 275 nm and IR radiation in the range from 1645 $cm^{-1}$ to 1610 $cm^{-1}$. Therefore, the UV absorption at 240 nm to 275 nm, and IR absorption at 1645 $cm^{-1}$ to 1610 $cm^{-1}$ is lower for a hydrogenated styrenic (meth)acrylic oligomer compared to a corresponding non-hydrogenated styrenic (meth)acrylic oligomer. As used herein, one of ordinary skill will appreciate that when comparing UV or IR absorbance of two polymers (or articles made from them) as discussed above, the thickness of polymeric films or the concentration of the polymeric solutions used will impact the result. Therefore the absorbance values obtained should be normalized with respect to the thickness, concentration, or such other parameters of the polymers or articles made from them.

"Absorbance" refers to the amount of radiation absorbed by an irradiated sample. Absorbance, A, is equal to the multiplication product of quantities E, c and l, where E is the molar or mass extinction coefficient, c is the concentration of the sample (e.g., a polymer or an oligomer) in the film or solution or dispersion, and l is the path length (thickness of the film or the width of the cuvette in which the solution or dispersion is contained). Therefore, to properly compare the absorbances of two different polymers or oligomers, parameters such as concentration, and thickness of a film or the path length should be appropriately considered.

"Styrenic monomers" refer to, α-methyl styrene (AMS), styrene (Sty), vinyl toluene, tertiary butyl styrene, o-chlorostyrene, and the like.

"Polydispersity ratio" or "polydispersity index" refers to $M_w/M_n$, or ratio of weight average molecular weight to number average molecular weight. Polymers or oligomers having the same average molecular weight, but having a different molecular polydispersity possess different solution viscosities. The product with the higher polydispersity has a higher solution viscosity, because high molecular weight fractions make a significantly greater contribution toward viscosity than low molecular weight fractions.

"Resins" refer to compositions including some amounts of a polymer or an oligomer.

"Styrenic (meth)acrylic oligomer," refers to polymers and oligomers having polymeric units derived from styrenic monomers and from (meth)acrylic monomers. Styrenic (meth)acrylic oligomers can contain from about 75% to about 99% non-volatile components. In some embodiments, the styrenic (meth)acrylic oligomers contain from about 90% to about 99% non-volatile components. Styrenic (meth)acrylic oligomers have a polydispersity ratio or index from about 1.5 to about 5. In some embodiments, the styrenic (meth)acrylic oligomer has a polydispersity ratio from about 1.5 to about 3. In some embodiments, the styrenic (meth)acrylic oligomer has a polydispersity ratio from about 1.5 to about 2. In some embodiments, the styrenic (meth)acrylic oligomer has a polydispersity ratio of about 1.7. Styrenic (meth)acrylic oligomers have a number average molecular weight ($M_n$) of about 1,000 g/mol to about 10,000 g/mol. In some embodiments, Mn is less than about 5000 g/mol. In some embodiments, the $M_n$ is from about 1000 g/mol to about 3000 g/mol. In some embodiment the $M_n$ is from about 1000 g/mol to about 2500 g/mol. A narrow molecular weight distribution allows for production of polymers with significantly lower content of high and low molecular weight fractions. Reduction of these high and low molecular weight fractions results in improved performance and lower viscosity in a given molecular weight range. In some embodiments, styrenic (meth)acrylic oligomers contain no styrenic monomers.

Styrenic (meth)acrylic oligomers have been produced by high-temperature (i.e. greater than about 180° C.) continuous bulk polymerization processes as described, e.g., in U.S. Pat. Nos. 4,414,370, 4,529,787, 4,546,160, and 6,984,694, each of which are incorporated herein by reference. In terms of their composition, such styrenic (meth)acrylic oligomers demonstrate batch to batch consistency. A variety of vinylic monomers are useful for preparing styrenic (meth)acrylic oligomers. Customarily, styrenic (meth)acrylic oligomers are prepared without using solvents. However, conventional styrenic (meth)acrylic oligomers, prepared by the customary high temperature processes, contain residual vinylic unsaturation or non-aromatic carbon-carbon double bonds. These unsaturations are terminal, vinylic double bonds.

Applications for styrenic (meth)acrylic oligomers include, without limitation, coatings and finishes for cans, coils, fabrics, vinyls, papers, autos, furniture, magnet wire, appliances, metal parts, wood panels and floors. See, e.g., U.S. Pat. Nos. 4,414,370, 4,529,787, and 4,546,160. Other applications for styrenic (meth)acrylic oligomers include uses as paints, inks, adhesives, tackifiers and dispersants. Such applications can require that copolymers be formed from hard monomers, soft monomers, acid monomers and/or monomers with other crosslinkable functionalities. Monomers tending to yield harder polymers are hard monomers such as, for example, styrenic monomers, and $C_1$-$C_3$ alkyl methacrylates. Monomers tending to yield softer polymers are soft monomers such as, for example, the acrylates and $C_4$ and higher methacrylates, such as n-butyl acrylate, 2-ethylhexyl acrylate and n-octyl acrylate. Styrenic (meth)acrylic oligomers are also useful as chain extenders. See, e.g., U.S. Pat. No. 6,984,694. In some embodiments, the styrenic (meth)acrylic oligomer is used in any of the above applications where the material is in direct contact with food. The styrene acrylic copolymers are also useful in inks, overprints, coatings, pigment dispersion resins for use in food contact applications where the food article is subjected to heat for example microwave heating, oven, contact with hot surfaces and foods.

Chain extender styrenic (meth)acrylic oligomers may have any one or more of the following characteristics. They have at least one functional group selected from the group epoxy, anhydride, and acid. When the functional group is epoxy, they have high number average epoxy functionality (Efn) values of up to 30, and, in some cases, even higher than 30. This includes Efn values from 1 to 20, inclusive. It also includes Efn values from 3 to 10, inclusive. The chain extender styrenic (meth)acrylic oligomers have polydispersity index (PDI) values from 1.5 to 5, inclusive. This includes PDI values from 1.75 to 4, inclusive. It also includes PDI values from 2 to 3.5, inclusive. The chain extender styrenic (meth) acrylic oligomers have low epoxy equivalent weights (EEW) from 2,800 to 180. This includes EEWs from 1,400 to 190. This also includes EEW from 700 to 200.

The chain extender styrenic (meth)acrylic oligomers have an $M_n$ of less than 6,000 g/mol and weight average molecular weight ($M_w$) of less than 25,000 g/mol allowing for high molecular mobility and fast incorporation of the chain extender into the polycondensate melt during compounding. The molecular weight range above includes various embodiments wherein $M_n$ ranges from about 1,000 g/mol to about 5,000 g/mol, including from about 1,500 g/mol to 4,000 g/mol, and further including from about 2,000 g/mol to about 3,000 g/mol. The molecular weight ranges above also include various embodiments wherein $M_w$ ranges from about 1,500 g/mol to about 18,000 g/mol, including from about 3,000 g/mol to about 13,000 g/mol, and further including from about 4,000 g/mol to about 8,500 g/mol. In addition, the chain extender styrenic (meth)acrylic oligomers possess a wide range of solubility parameters tailored for high solubility in polycondensates. In various embodiments, the chain extenders have an EEW of from 180 to 300, an Efn value from 4 to 12 and a PDI of from 1.5 to 2.8. In other embodiments, the chain extenders have an EEW of from 300 to 500, an Efn value of from 4 to 12 and a PDI of from 2.8 to 3.2. In still other embodiments, the chain extenders have an EEW of from 500 to 700, an Efn value of from 4 to 12 and a PDI of from 3.2 to 4.5.

Low-Temperature Processes

In one aspect, oligomers are prepared under low-temperature conditions. As used herein, low-temperature is a relative term as it is used in comparison to conventional, high temperature methods of preparation that use significantly higher temperatures to effect the polymerization. Such methods include, but are not limited to, continuous bulk polymerization processes, and batch and semi-batch polymerization processes. These processes may involve continuously charging into a reactor a vinylic monomer including a (meth)acrylic monomer, a styrenic monomer, or mixture of any two or more such vinylic monomers.

According to one embodiment of the low temperature polymerization process, the vinylic monomer and a polymerization initiator are continuously charged to a reactor, along with a reaction solvent, to form a reaction mixture. The reaction mixture is then maintained at a temperature sufficient to cause polymerization of the vinylic monomer. The reaction mixture may be agitated to effect the mixing of the reactants. The temperature sufficient to cause polymerization of the vinylic monomers may be from about 120° C. to about 165° C., according to any of the above processes. In some embodiments, the temperature that may be used for any of the low temperature polymerization processes is about 140° C. In some other embodiments, the temperature that may be used for any of the low temperature polymerization processes is about 150° C. Oligomers prepared by such a process exhibit an insubstantial amount of olefinic unsaturation.

As used herein, an "insubstantial amount of olefinic unsaturation" means that the oligomer is essentially free of olefinic unsaturation in the resin, except for possibly a small amount. In some embodiments, the insubstantial amount of olefinic unsaturation is measured by IR or NMR spectroscopic techniques. According to some embodiments, the insubstantial amount of olefinic unsaturation is characterized by an absence of a significant IR absorption in the range of 1645 cm$^{-1}$ to 1610 cm$^{-1}$. According to other embodiments, the insubstantial amount of olefinic unsaturation is characterized by an absence of a significant resonance in the range of 4.5 to 5.5 ppm in the $^1$H NMR, referenced to tetramethylsilane. As used herein a "significant" IR absorbance or resonance is one that is regarded as a definitive signal at the indicated position for the styrene acrylic resin. As used herein, it is typically used to refer to the lack, or absence, of a substantial signal, which is indicative that the styrene acrylic resin has none, or at least an insubstantial amount of olefinic unsaturation. The reverse corollary is that the presence of the signal would be indicative of olefinic unsaturation in the styrene acrylic resin.

Suitable vinylic monomers for use in the methods include, but are not limited to styrenic monomers, (meth)acrylic monomers, ethylenic monomers, hydroxyalkyl acrylates, hydroxyalkyl methacrylates, and ethylenic monomers. Suitable styrenic monomers include, but are not limited to α-methyl styrene, styrene, vinyl toluene, tertiary butyl styrene, o-chlorostyrene, or a mixture of any two or more such styrenic monomers. Suitable (meth)acrylic monomers include, but are not limited to, methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate, methyl acrylate, ethyl acrylate, n-propyl acrylate, isopropyl acrylate, n-butyl acrylate, n-decyl acrylate, isobutyl acrylate, n-amyl acrylate, n-hexyl acrylate, isoamyl acrylate, 2-hydroxyethyl acrylate, 2-hydroxypropyl acrylate, N,N-dimethylaminoethyl acrylate, N,N-diethylaminoethyl acrylate, t-butylaminoethyl acrylate, 2-sulfoethyl acrylate, trifluoroethyl acrylate, glycidyl acrylate, benzyl acrylate, allyl acrylate, 2-n-butoxyethyl acrylate, 2-chloroethyl acrylate, sec-butyl-acrylate, tert-butyl acrylate, 2-ethylbutyl acrylate, cinnamyl acrylate, crotyl acrylate, cyclohexyl acrylate, cyclopentyl acrylate, 2-ethoxyethyl acrylate, furfuryl acrylate, hexafluoroisopropyl acrylate, methallyl acrylate, 3-methoxybutyl acrylate, 2-methoxybutyl acrylate, 2-nitro-2-methylpropyl acrylate, n-octylacrylate, 2-ethylhexyl acrylate, 2-phenoxyethyl acrylate, 2-phenylethyl acrylate, phenyl acrylate, propargyl acrylate, tetrahydrofurfuryl acrylate, tetrahydropyranyl acrylate, and mixtures of any two or more such (meth)acrylates. In some embodiments, the (meth)acrylic monomer includes ethyl acrylate, methyl (meth)acrylate, butyl (meth) acrylate, 2-ethylhexyl (meth)acrylate, hydroxyethyl (meth) acrylate, glycidyl (meth)acrylate, or acrylic acid. In some embodiments, the (meth)acrylic monomer includes glycidyl (meth)acrylate.

The vinylic monomers may include styrenic monomers, (meth)acrylic monomers, or a mixture of such monomers. Where the vinylic monomers include such a mixture, the vinylic monomers may include from about 40 wt % to about 65 wt % of a styrenic monomer; and from about 35 wt % to about 60 wt % of a (meth)acrylic monomer. In some embodiments, the vinylic monomers include a mixture of styrene and glycidyl (meth)acrylate. In some such embodiments, the vinylic monomers include from about 40 to about 65 wt % of styrene and from about 35 to about 60 wt % glycidyl (meth) acrylate.

According to the process, the reactor may be continuously charged with a polymerization initiator. The initiators suitable for carrying out the process may thermally decompose into radicals in a first order reaction. Suitable initiators include those with half-life periods in the radical decomposition process of 1 hour at temperatures greater or equal to 90° C., and further include those with half-life periods in the radical decomposition process of 10 hours at temperatures greater or equal to 100° C. Others with 10 hour half-lives at temperatures lower than 100° C. may also be used. For example, and without limitation, the polymerization initiators may include, but is not limited to, 2,2'-azodi-(2,4-dimethylvaleronitrile); 2,2'-azobisisobutyronitrile (AIBN); 2,2'-azobis(2-methylbutyronitrile); 1,1'-azobis(cyclohexane-1-carbonitrile); tertiary butylperbenzoate; tert-amyl peroxy 2-ethylhexyl carbonate; 1,1-bis(tert-amylperoxy)cyclohexane, tert-amylperoxy-2-ethylhexanoate, tert-amylperoxyacetate, tert-butylperoxyacetate, tert-butylperoxybenzoate (TBPB), 2,5-di-(tert-butylperoxy)-2,5-dimethylhexane, di-tert-amyl peroxide (DTAP); di-tert-butylperoxide (DTBP); lauryl peroxide; dilauryl peroxide (DLP), succinic acid peroxide; or benzoyl peroxide. In some embodiments, the polymerization initiator includes 2,2'-azodi-(2,4-dimethylvaleronitrile); 2,2'-azobisisobutyronitrile (AIBN); or 2,2'-azobis(2-methylbutyronitrile). In other embodiments, the polymerization initiator includes di-tert-amyl peroxide (DTAP); di-tert-butylperoxide (DTBP); lauryl peroxide; succinic acid peroxide; or benzoyl peroxide. The amount of polymerization initiator that is used is dependent upon the conditions of the reaction and may be adjusted accordingly. However, in some embodiments, the amount of polymerization initiator ranges from 0 wt % to 5 wt %, based upon the weight of the vinylic monomers, while in other embodiments, the amount ranges from 2 wt % to 5 wt %.

The reaction solvent may be continuously fed into the reactor together with the monomers, or in a separate feed. The solvent may be any solvent well known in the art, including those that do not react with the vinylic monomer(s) at the temperatures of the polymerization process described herein. Suitable reaction solvents include, but are not limited to, acetone, aromatic 100, aromatic 150, aromatic-200, ethyl-3-ethoxypropionate, methyl amyl ketone, methylethylketone, methyl-iso-butylketone, N-methylpyrrolidone (NMP), (propylene glycol monomethyl ether acetate, xylene, toluene, ethyl benzene, carbitol, cyclohexanol, dipropylene glycol (mono)methyl ether, n-butanol, n-hexanol, hexyl carbitol, iso-octanol, iso-propanol, methyl cyclohexane methanol, decyl alcohol, lauryl alcohol, myristal alcohol, cetyl alcohol, stearyl alcohol, behenyl alcohol, or isoparaffins. In some embodiments, the reaction solvent is xylene, toluene, ethyl benzene, aromatic-100, aromatic-150, aromatic-200, acetone, methylethylketone (MEK), methylamylketone (MAK), methyl-iso-butylketone (MIBK), N-methylpyrrolidinone, isopropanol or isoparaffins. The solvents are present in an amount desired, taking into account reactor conditions and monomer feed. In one embodiment, one or more solvents are present in an amount of from about 20 wt % to about 80 wt %. In another embodiment, one or more solvents are present in an amount of from about 30 wt % to about 75 wt %. In another embodiment, one or more solvents are present in an amount of from about 35 wt % to 70 wt %.

The method of preparing the oligomers at low temperature may be a continuous reactor process. According to such methods, the residence time, i.e. the time that a particular reactant is in the reactor on average, is dependent upon reactor design and reaction conditions to achieve certain properties. In some embodiments, the residence time of the reaction mixture is from 5 minutes to 60 minutes. Suitable reactors include, but are not limited to, continuous stirred tank reactors ("CSTRs"), tube reactors, loop reactors, extruder reactors, combinations of any two or more thereof, or any reactor suitable for continuous operation.

A suitable form of a CSTR is a tank reactor provided with cooling coils and/or cooling jackets. The cooling coils and/or the cooling jackets provide for sufficient removal of the heat of polymerization not taken up by raising the temperature of the continuously charged monomer composition to maintain a preselected temperature for polymerization therein. Such a CSTR may be provided with at least one, and usually more, agitators to provide a well-mixed reaction zone. Such CSTR may be operated at varying filling levels from about 20% to 100% full (liquid full reactor LFR). In one embodiment the reactor is more than 50% full but less than 100% full. In another embodiment the reactor is 100% liquid full.

The continuous polymerization is carried out at temperatures that are lower than those used for customary bulk polymerization processes for producing such oligomers. In one embodiment, the polymerization temperatures range from about 120° C. to about 165° C. In another embodiment, the polymerization temperature is from about 130° C. to about 165° C. In another embodiment, the polymerization temperature is from about 120° C. to about 150° C. In another embodiment, the polymerization temperature is from about 140° C. to about 150° C.

Oligomers prepared at low temperature, according to the above processes, may have a number average molecular weight ($M_n$) that ranges from a number average molecular weight ($M_n$) that ranges from about 1,000 g/mol to about 10,000 g/mol. For example, where the oligomer is a styrenic (meth)acrylic oligomer it has a $M_n$ from about 1,000 g/mol to about 10,000 g/mol.

Hydrogenation Processes

In another aspect, process for preparing a hydrogenated styrenic (meth)acrylic oligomer is provided. Such oligomers may be prepared by conventional, i.e. high temperature, process, with the oligomer produced being subjected to an hydrogenation process to provide styrenic (meth)acrylic oligomer having a low olefinic character. For example, the styrenic (meth)acrylic oligomer may be made by a continuous polymerization process that includes charging into a reactor a mixture including vinylic monomers, as described above for oligomers made by the low temperature process, and a polymerization initiator. The reactor is then maintained at a temperature of from 175° C. to 300° C. for a time period sufficient to oligomerize the monomers. A styrenic (meth)acrylic oligomer containing olefinic unsaturation is then isolated, and is hydrogenated to form a styrenic (meth)acrylic oligomer having an insubstantial amount of olefinic unsaturation. In some embodiments, the hydrogenation includes contacting the styrenic (meth)acrylic oligomer with hydrogen and a hydrogenation catalyst.

In some embodiments, hydrogenation catalysts include those that are known to effect hydrogenation of an unsaturated molecule. For example, such catalysts may include those of palladium, platinum, nickel, rhodium, iridium, and the like, including mixtures of any two or more such catalysts or alloys thereof. In some embodiments, the hydrogenation catalyst includes palladium, platinum, or nickel. In some such embodiments, the hydrogenation catalyst may be palladium on carbon, platinum on carbon, or Raney nickel.

As with the oligomers made by the low temperature methods, the hydrogenated styrenic (meth)acrylic oligomers may be characterized by an absence of a significant IR absorption in the range of 1645 cm$^{-1}$ to 1610 cm$^{-1}$, according to some embodiments. In other embodiments, the hydrogenated styrenic (meth)acrylic oligomers may be characterized by an absence of a significant resonance in the range of 4.5 ppm to 5.5 ppm in the $^1$H NMR, referenced to tetramethylsilane. The hydrogenated styrenic (meth)acrylic oligomers may have a number average molecular weight ($M_n$) of about 1,000 g/mol to about 10,000 g/mol and/or a weight average molecular weight ($M_w$) of about 1,500 g/mol to about 30,000 g/mol.

In another embodiment, the (meth)acrylic, styrenic, or styrenic (meth)acrylic oligomer is a chain extender oligomer. The (meth)acrylic, styrenic, or styrenic (meth)acrylic oligomers may also be used in printing inks, surface coatings, overprint varnishes, pigment dispersants, foams, films, sheets, extrusion coatings, extrusion plastics, bottles, and as in-reactor chain extenders for polycondensates, or be incorporated into a wide variety of other articles. In some embodiments, such uses and articles include a styrenic (meth)acrylic oligomer.

Any of the above oligomers or styrenic (meth)acrylic oligomers may be combined with a carrier to produce a masterbatch compound. The masterbatch compound may include from about 5 wt % to about 50 wt % of the oligomer or styrenic (meth)acrylic oligomer. In some embodiments, the oligomer or styrenic (meth)acrylic oligomer is present in the masterbatch compound from about 15 wt % to about 35 wt %. The carrier may be a reactive or non-reactive carrier. As used herein a masterbatch compound is defined as premixed composition containing the oligomer additive and carrier. As used herein, a reactive carrier is a diluting matrix that additionally may contain reactive groups that may react with the oligomer additive during processing, and illustrative examples include, but are not limited to, PET, PETG, and PLA. As used herein, a non-reactive carrier is a diluting matrix that does not contain reactive groups that can react with the oligomer additive during processing, and illustrative examples include, but are not limited to, polyolefins such as polyethylene and polypropylene.

Stability of the Low-Temperature Produced and Hydrogenated Oligomers

Figure 3:
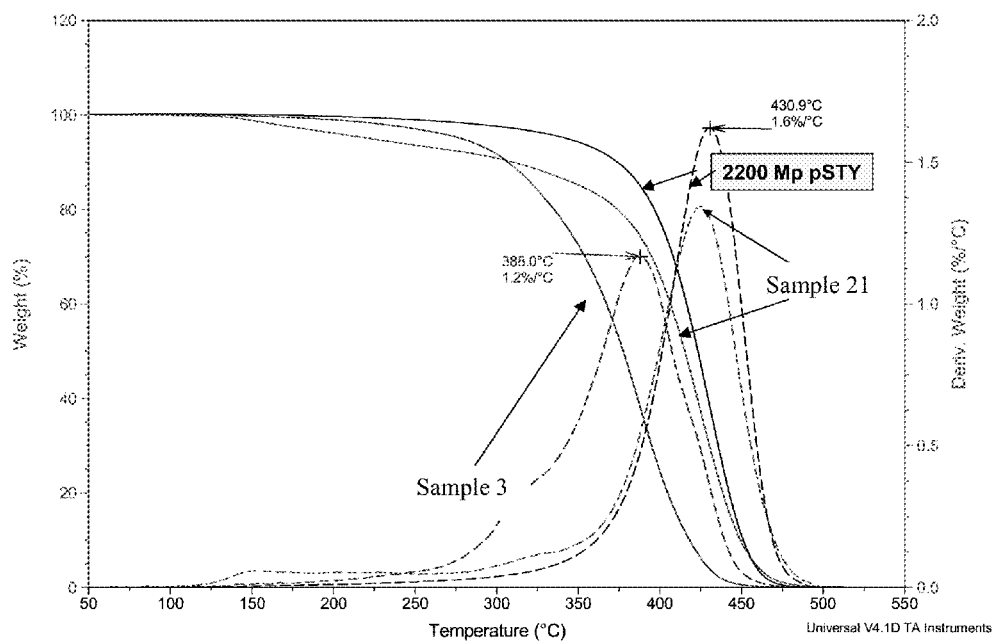
FIG. 3 shows thermogravimetric analysis (TGA) plots for illustrative samples and comparative samples, according to the examples.
Figure 5:
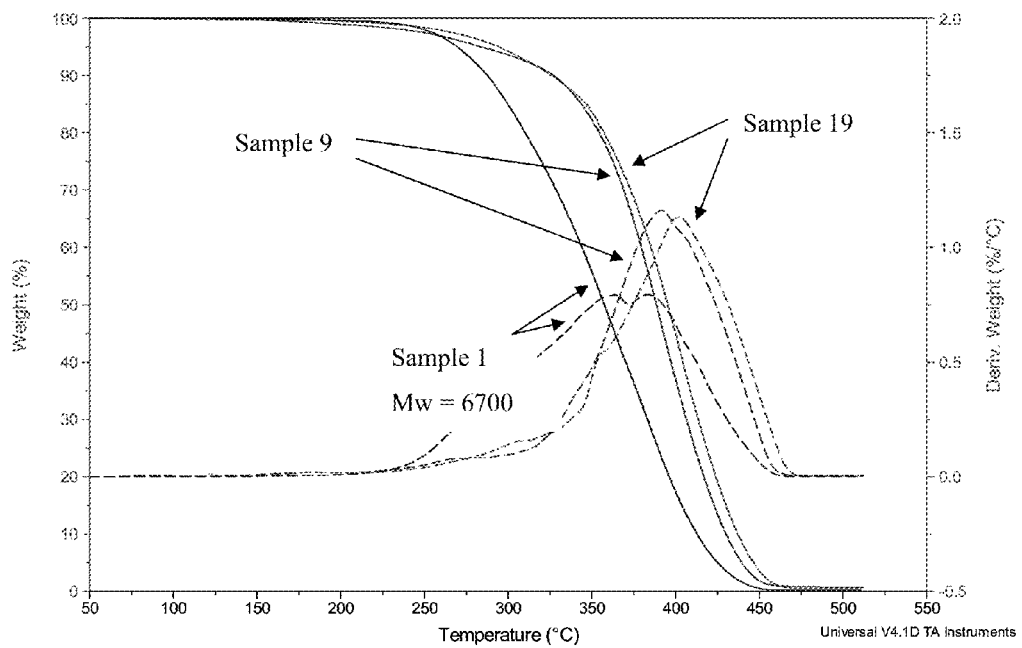
FIG. 5 shows TGA traces for a high temperature produced sample and its hydrogenated analogue, compared to a standard example, according to the examples.

The oligomers of the present technology may be characterized by their improved thermal stability. Such thermal stability is further discussed below, however, briefly referring to FIGS. 3 and 5, the oligomers without olefinic unsaturation, or with only a minimal amount of olefinic character, are much more stable thermally than the oligomers which are conventionally prepared. FIGS. 3 and 5 clearly show that the hydrogenated styrenic (meth)acrylic oligomer, or in other words those styrenic (meth)acrylic oligomers lacking olefinic character, has a higher thermal degradation profile than the conventional styrenic (meth)acrylic oligomers without hydrogenation. Without being bound by theory, the hydrogenated styrenic (meth)acrylic oligomers and low temperature produced oligomers contain fewer terminal or vinylic carbon-carbon double bonds than the corresponding non-hydrogenated styrenic (meth)acrylic oligomers. Polymers containing terminal carbon-carbon double bonds can de-polymerize upon heating and ultimately decompose. As a result, the hydrogenated styrene-acrylic oligomers and low-temperature oligomers undergo less depolymerization upon heating and are thermally more stable than the corresponding non-hydrogenated styrenic (meth)acrylic oligomers.

Any of the above styrenic oligomers, (meth)acrylic oligomers, styrenic (meth)acrylic oligomers, or hydrogenated styrenic (meth)acrylic oligomers may be used to provide improved properties when used as chain extenders for polycondensates such as polyethylene terephthalate (PET), poly (lactic) acid (PLA), poly(glycolic) acid (PGA), PLA blends, poly(lactic-glycolic) acid, polyhydroxybutyrate (PHB), polyhydroxybutyrate-co-valerate (PHBV), PHB blends, etc.; as flow modifiers in plastics; as dispersants in plastics; and as compatibilizers in plastics. In particular, the chain extended compositions containing the above oligomers show improved thermal stability over those oligomers made by conventional high temperature polymerization processes. In particular, there is an increase in temperature for onset of thermal degradation and a decrease in the amount of volatiles emitted upon thermal decomposition.

Coating compositions including any of the above styrenic oligomers, (meth)acrylic oligomers, styrenic (meth)acrylic oligomers, or hydrogenated styrenic (meth)acrylic oligomers show improved weatherability in comparison with compositions including oligomers made by conventional high temperature polymerization processes.

Emulsion polymers and colloidal systems including any of the above styrenic oligomers, (meth)acrylic oligomers, styrenic (meth)acrylic oligomers, or hydrogenated styrenic (meth)acrylic oligomers show improved properties when used as supports for emulsion polymerization in comparison with compositions including oligomers made by conventional high temperature polymerization processes.

The above described emulsion polymers and colloidal systems using any of the above styrenic oligomers, (meth)acrylic oligomers, styrenic (meth)acrylic oligomers, or hydrogenated styrenic (meth)acrylic oligomers show improved properties when used as dispersants and as binders for printing inks, coatings, adhesives, etc in comparison with compositions including oligomers made by conventional high temperature polymerization processes.

The present invention, thus generally described, will be understood more readily by reference to the following examples, which are provided by way of illustration and are not intended to be limiting of the present invention.

EXAMPLES

General Procedures

Measurement of Polymer Molecular Weight by GPC.

To measure molecular weight of the example polymers described below, the polymeric resin was first dissolved in a solution of tetrahydrofuran (THF) solvent then injected into a Gel Permeation Chromatogram (Waters 2695 instrument coupled with Waters 2410 Refractive Index Detector. One pair of PLGEL MIXED B columns with one guard column was used and Millennium software was used to determine the number average molecular weight (Mn), weight average molecular weight (Mw) and z average molecular weight (Mz) of the polymer.

NMR Analysis of Polymer Samples.

Resin samples were dissolved in a suitable deuterated solvent such as $CDCl_3$ or $(CD_3)S(O)CD_3$ at about 2 wt %. A Brüker 300 MHz NMR was used to record the proton NMR spectra.

Thermal Gravimetric Analysis of Polymers.

Polymers were analyzed by thermogravimetric analysis (TGA) using a Q50 instrument (TA Instruments) by the following procedure. A sample typically weighing between 10 and 15 mg was placed into a tared Pt crucible. Starting from room temperature, the temperature was ramped at 20° C./min up through the final approximate temperature of 550° C. The weight versus temperature, the first derivative curves were recorded.

UV Analysis of Polymers.

An HP 8453 UV-Vis spectrophotometer was used to record the UV spectral properties of acrylic polyol films cured with an isocyanurate. The absorbance curves for the before and after hydrogenation of the acrylic polyol were compared.

Gardner Dry Times.

Dry times were measured with a Gardner drying time recorder provided by Paul N. Gardner Co. (Quadcycle cat DT-5040 and Multicycle cat DT-5020). A freshly coated sample was placed under the instrument and a stylus with Teflon ball is lowered to contact the surface. The stylus rotates over time and the surface of the coating is inspected. Set to touch, tack free, dry hard and dry through times are recorded by the operator.

Konig Hardness.

Konig Hardness was measured by a Konig Pendulum Hardness Tester, model Byk-Gardner Pendulum Konig, cat No 5856. The average of 3 tests measuring the number of swings required before stopping was used.

UV Exposure Testing.

UV exposure tests were conducted in a Q-Lab Corp machine. QUV A tests were conducted with a UVA 340 bulb at 0.89 irradiance for 4 hours at 60° C. then 4 hours without light at 50° C. QUV B tests were conducted with a UVB 313 bulb at 0.48 irradiance for 8 hours at 70° C. then 4 hours without light at 50° C.

Weatherometer Testing.

Panels were subjected to accelerated weathering in an Atlas CI 4000 weatherometer running a J-2527 cycle. Cycle conditions are shown below.

| Parameters | Segments | | | |
|---|---|---|---|---|
| | 1 | 2 | 3 | 4 |
| Light/Dark | Dark | Light | Light | Light |
| Time (hour) | 1 | 0.66 | 0.33 | 1 |
| Radiant Exposure (Joules/m$^2$) | 0 | 1320 | 660 | 1980 |
| Irradience (W/m$^2$) | 0.00 | 0.55 | 0.55 | 0.55 |
| Rack Panel Temp* (° C.) | 0.0 | 70.0 | 70.0 | 70.0 |
| Chamber Temp (° C.) | 38.0 | 47.0 | 47.0 | 47.0 |
| Relative Humidity (%) | 95.0 | 50.0 | 50.0 | 50.0 |
| Specimen Spray | on | off | on | off |
| Rack Spray | on | off | off | off |

Example 1

Preparation of Styrene-Acrylic Polymeric Resins by Conventional High Temperature Polymerization Methods The compositions shown in Table 1 were continuously charged to a continuous stirred tank reactor and the product simultaneously withdrawn. The products were continuously charged to a heated evaporator to remove as much residual monomers and solvent as possible. Table 1 shows the samples prepared.

TABLE 1

Product Composition For Samples Produced At High Temperatures.

| | Sample Number | | | | | | | |
|---|---|---|---|---|---|---|---|---|
| | 1 | 2 | 3 | 4 | 5 | 6 | 7 | 8 |
| Sty (wt %) | 43.6 | 44.5 | 99.5 | 0 | 31.8 | 14.86 | 12.7 | 61.23 |
| BA (wt %) | 0 | 0 | 0 | 64.6 | 0 | 19.62 | 7.64 | |
| GMA (wt %) | 46.1 | 47 | 0 | 29.4 | 0 | 0 | 0 | 29.22 |
| MMA (wt %) | 1 | 1 | 0 | 0 | | 22.3 | 51.85 | 0.95 |
| EHA (wt %) | 0 | 0 | 0 | 1 | 27.4 | | | |
| HEMA (wt %) | | | | | 31.7 | 23.3 | 7.77 | |
| AMS (wt %) | | | | | | 2.44 | | |
| AA (wt %) | | | | | | | 1.64 | |
| Solvent (wt %) | 7.8 | 4 | | 4 | 8.2 | 17.3 | 17.9 | 6.1 |
| DTBP (wt. %) | 1.5 | 3.5 | 0.5 | 1 | 1 | 0.21 | 0.46 | 2.39 |
| Reactor Temp (° C.) | 192 | 178 | 273 | 207 | 236 | 212 | 183 | 203 |
| Residence time (min) | 15 | 30 | 12 | | 12 | 12 | 15 | 12 |
| Mn | 2400 | 2310 | 1520 | 1920 | 1444 | 2933 | 2970 | 2377 |
| Mw | 6650 | 6940 | 3230 | 6040 | 2580 | 8195 | 11908 | 5633 |
| Mw/Mn | 2.8 | 3.0 | 2.1 | 3.1 | 1.8 | 2.8 | 4.0 | 2.37 |

Example 2

Preparation of Styrene-Acrylic and Hydroxyfunctional Styrene-Acrylic Polymeric Resins at Low Reaction Temperatures This example describes the production of styrene-acrylic resins by a continuous process at low reaction temperatures. For each run, the monomers were mixed with solvent and initiator then continuously charged to a continuous, stirred tank reactor and product simultaneously withdrawn. The product was charged to a heated evaporator to remove as much residual monomer and solvent as possible. Table 2 shows the samples prepared.

TABLE 2

Samples Produced At Low Temperatures.

| | Sample | | | | | | | | | |
|---|---|---|---|---|---|---|---|---|---|---|
| | 9 | 10 | 11 | 12 | 13 | 14 | 15 | 16 | 17 | 18 |
| Sty (wt %) | 24.8 | 24.8 | 24.8 | 12.06 | 10.66 | | 27.7 | 32.63 | 22.9 | 32.8 |
| GMA (wt %) | 24.2 | 24.2 | 24.2 | | | | 28.3 | 33.7 | 23.6 | 33.8 |
| MMA (wt %) | 0.5 | 0.5 | 0.5 | 18.11 | 43.53 | 16.63 | 0.5 | 0.67 | 0.5 | 0.4 |
| BA (wt %) | | | | 15.93 | 6.41 | | | | | |
| HEMA (wt %) | | | | 18.92 | 6.52 | 23.28 | | | | |
| AMS (wt %) | | | | 1.98 | | | | | | |
| AA (wt %) | | | | | 1.38 | | | | | |
| BMA (wt %) | | | | | | 26.6 | | | | |
| DTAP (wt %) | | | | 3 | 1.5 | 3.5 | 3.5 | | | 3.00 |
| Vazo67 (wt %) | 2 | | | | | | | | 50 | |
| Vazo88 (wt %) | | 2 | | | | | | | | |
| TBPB (wt %) | | | | | | | | 3 | | |
| DTBP | | | | | | | | | 3 | |
| DLP (wt %) | | | 2 | | | | | | | |
| Solvent (wt %) | 48.5 | 48.5 | 48.5 | 30 | 30 | 30 | 20 | 30 | 50 | 30.0 |
| Temp (° C.) | 140 | 140 | 140 | 150 | 150 | 150 | 150 | 150 | 150 | 160 |
| Res. Time (min) | 15 | 15 | 15 | 30 | 30 | 30 | 25 | 15 | 15 | 15 |
| Mn | 3525 | 3510 | 6460 | 2691 | 4236 | 2634 | 2496 | 3231 | 2366 | 3470 |
| Mw | 7850 | 8570 | 16840 | 6499 | 13428 | 6183 | 4773 | 8195 | 8948 | 7010 |
| Mw/Mn | 2.2 | 2.4 | 2.6 | 2.4 | 3.2 | 2.3 | 1.9 | 2.5 | 3.78 | 2.02 |

Samples 12 and 13 are essentially remakes of Samples 6 and 7, prepared at the lower temperature conditions using di-tert-amylperoxide (DTAP) as opposed to the DTBP. Comparison between Samples 6 and 12 and between 7 and 13 show that at lower temperatures with the DTAP initiator, polymers are produced having a lower polydispersity as measured by Mw/Mn, but which exhibit essentially the same Mw. The lower polydispersity in Sample 13 compared to Sample 7 is notable. Samples 7 and 13 both contain acid and hydroxy functionalities which under certain conditions may react via an esterification reaction to form crosslinked polymer chains. Thus, the lower temperature process allows the production of dual functional polymers of a narrower molecular weight distribution.

Example 3

Hydrogenation of High-Temperature Produced Styrene-Acrylic Resins

In this example, resin samples 1-5 were hydrogenated to remediate C—C unsaturation. Hydrogenation was carried on a laboratory scale as follows. The resins were first dissolved in xylene solvent at approximately 50 wt % solids. A 1 liter vessel was charged with the resin/solvent solution and hydrogenation catalyst, as shown in Table 3. The catalyst used for all experiments was Pd/C. The vessel was brought to temperature and, under continuous high agitation of approximately 1500 RPM, hydrogen was added under pressure. After various periods, the reaction was stopped and the contents filtered in order to remove the catalyst. The xylene solvent was removed in a further processing step under temperature and vacuum using a standard Büchi Lab rotary evaporator.

TABLE 3

Hydrogenated Styrene-Acrylic Resin Samples.

| | Sample | | | | | |
|---|---|---|---|---|---|---|
| | 19 | 20 | 21 | 22 | 23 | 24 |
| Resin | 1 | 2 | 3 | 4 | 5 | 8 |
| Resin (g) | 300 | 300 | 300 | 400 | 333 | 300 |
| Xylene (g) | 200 | 200 | 200 | 0 | 167 | 200 |
| Catalyst (wt %) | 1 | 1 | 1 | 1 | 1 | 1 |
| T (° C.) | 100 | 100 | 75 | 100 | 100 | 100 |
| P (psig) | 100 | 100 | 100 | 100 | 100 | 100 |
| time (h) | 3 | 2 | 2 | 2 | 2 | 2 |

Example 4

Effect of Hydrogenation on the Properties of Resin

The properties of the resins produced before and after hydrogenation were determined. The properties that were checked included molecular weight, as determined by GPC, structure including back-bone double bond content by NMR, and thermal stability via TGA (thermogravimetric analysis). As illustrated by FIG. 1, a GPC trace overlay compares the retention times for Sample 3 with its hydrogenated analogue, Sample 21. It is readily apparent that there is no practical change in molecular weight to the resin as a result of the hydrogenation. The large peak in the chromatogram for the hydrogenated sample at about 21 minutes is the solvent (xylene) that was used to dissolve the resin for the hydrogenation process.

Figure 2:
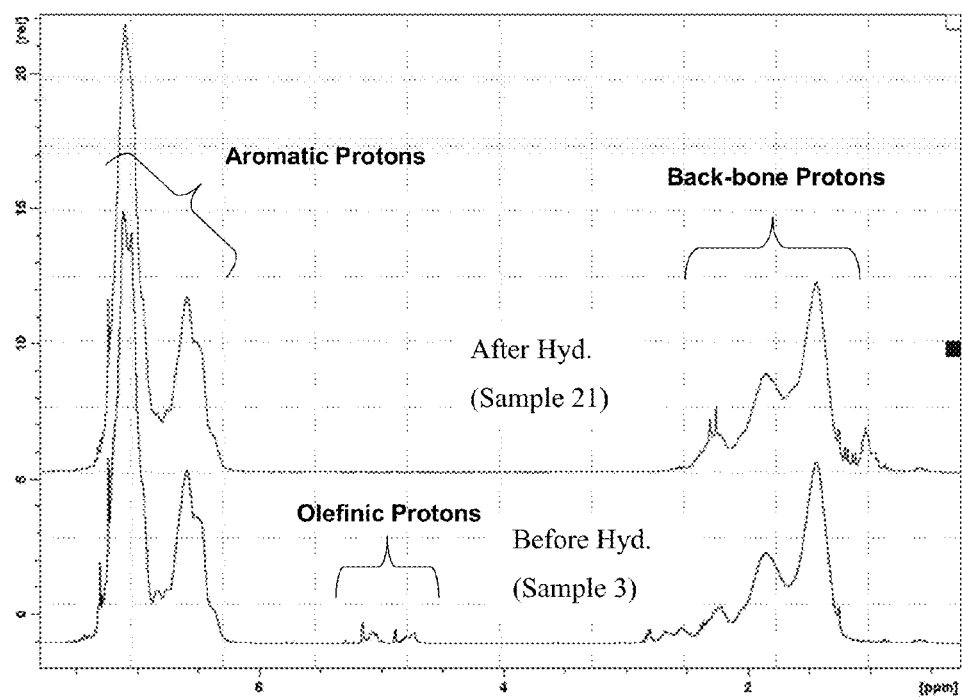
FIG. 2 illustrates the $^1$H NMR spectra for a high temperature produced product in comparison to its hydrogenated analogue, according to the examples.

To verify that the hydrogenation process was successful in removing the high-temperature produced, back-bone unsaturation, it is necessary to use an analytical technique which can probe the structure such as NMR or IR spectroscopy. The proton NMR trace for Sample 3 made at high temperature is compared to that of its hydrogenated product, Sample 21 in FIG. 2. While the general bulk structure, as compared between the two NMR traces, is unchanged in terms of either the aromatic protons or the back-bone proton resonances, it can be readily seen that the smaller peaks associated with the olefinic protons completely vanish as a result of the hydrogenation.

A key example of an improved end-use property is illustrated in FIG. 3, which shows an overlay of the TGA traces for Samples 3 and 21. Aside from the residual solvent in Sample 21, which volatilizes from about 125 to 200° C., the main decomposition peak has shifted from 388° C. to 430° C. In addition, the decomposition peak in the 1$^{st}$ derivative profile for the starting material near 300° C. has been completely removed. Interestingly, the TGA profile for the hydrogenated materials now more or less matches that of a polystyrene resin with molecular weight of 2200 produced by anionic polymerization of a similar, but much narrower, molecular weight.

Example 5

Figure 4:
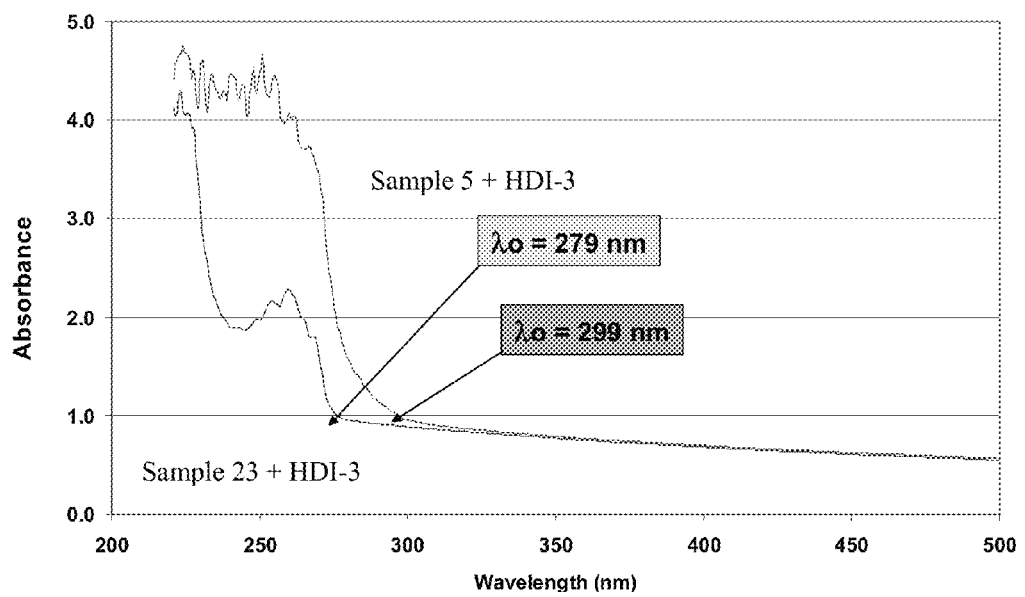
FIG. 4 shows UV-VIS spectra for a high temperature produced sample and its hydrogenated analogue, according to the examples.

Changes in UV Absorption as a Result of Hydrogenation of Acrylic Polyol Coatings Coating formulations were prepared by mixing Samples 5 or 23 with hexamethylene di-isocyanate trimer (HDI-3) at a molar ratio of 1:1 OH to NCO functionality, in xylene stock and additional n-butyl acetate to form a solution of approximately 60 wt % solids. To the formulations, 0.01 parts per hundred (pHR) of catalyst dibutyltin dilaurate (DBTDL) was added and mixed uniformly. The coating formulation was cast just prior to the gel point on a Teflon sheet, air flashed for 24 hours, and finally baked in an oven at 100° C. for 90 min. The films were removed from the Teflon, measured at 34 dry microns and then placed in a UV-Vis spectrophotometer to compare the before and after hydrogenation light absorption properties. FIG. 4 shows that there is considerably more UV absorbance in the resin from Sample 5, as compared to a resin with hydrogenated Sample 23. In addition, the wavelength for the onset of absorbance has moved to higher energy, from 299 to 279 nm. It is important to note that otherwise, these two resins behaved identically, having the same gel time, OH content, and final film hardness.

Example 6

Thermal Stability of a Styrene-Methacrylate Copolymer

Figure 6:
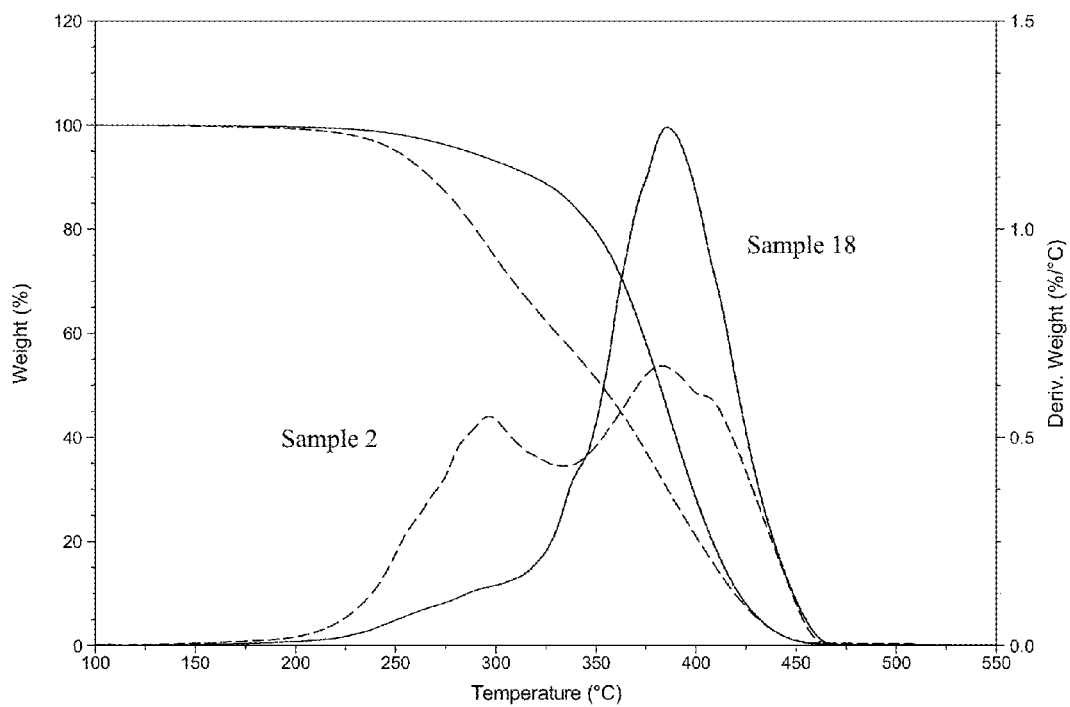
FIG. 6 is a comparison TGA graph of Sample 2 and Sample 18, according to the examples.

The weight loss and first-derivative curves for Samples 1, 9, and 19, with respect to temperature, are shown in FIG. 5. It is readily seen that the processes of both Samples 9 and 19 result in more thermally stable styrenic-(meth)acrylate compositions, as compared to the high-temperature produced resin of Sample 1. FIG. 6 also shows the comparison of a polymer (Sample 18) made at low temperature using DTAP initiator in comparison to an equivalent polymer made at higher temperatures (Sample 2) and shows an improvement in thermal stability.

Example 7

Chain-Extension in Polylactic Acid (PLA)

Three pairs of control resins and a corresponding hydrogenated analog were compounded with PLA (Ingeo 4042D, Natureworks) at a resin loading of 1.0 wt %. The materials were dry-blended, flood-fed and extruded into pellets using a Brabender conical twin-screw extruder. For the PLA case, the peak-processing temperature was 230° C. and the residence time was about 90 seconds. Some material was taken (a first pass), with the remainder sent back through the extruder for a second pass.

Figure 7:
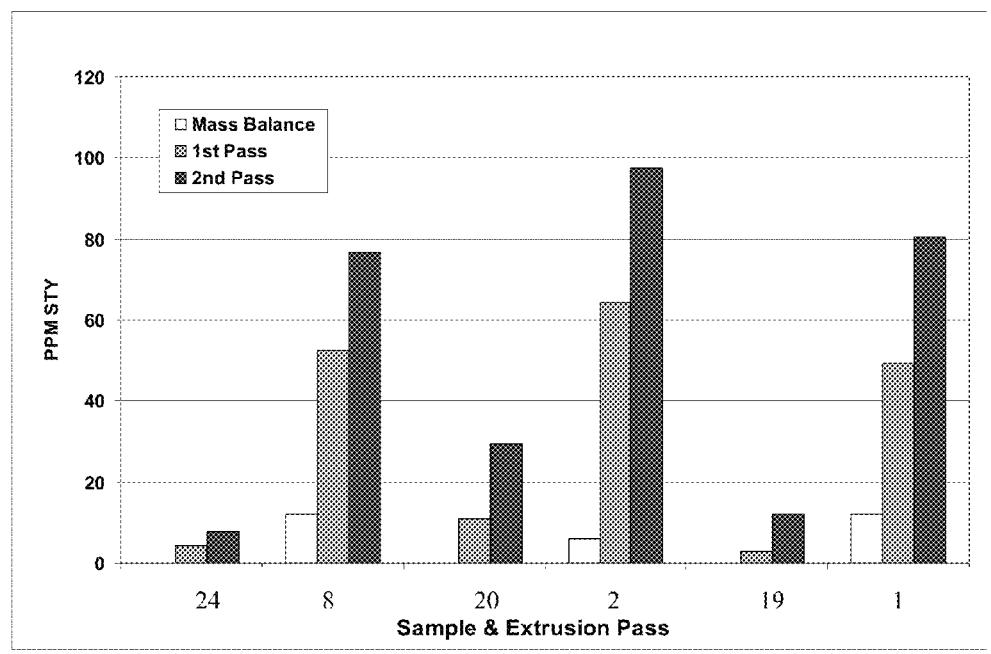
FIG. 7 is a graph of styrene monomer from 1 wt % compounding in PLA based the mass balance and after the first and second passes through an extruder, according to the examples.
Figure 8:
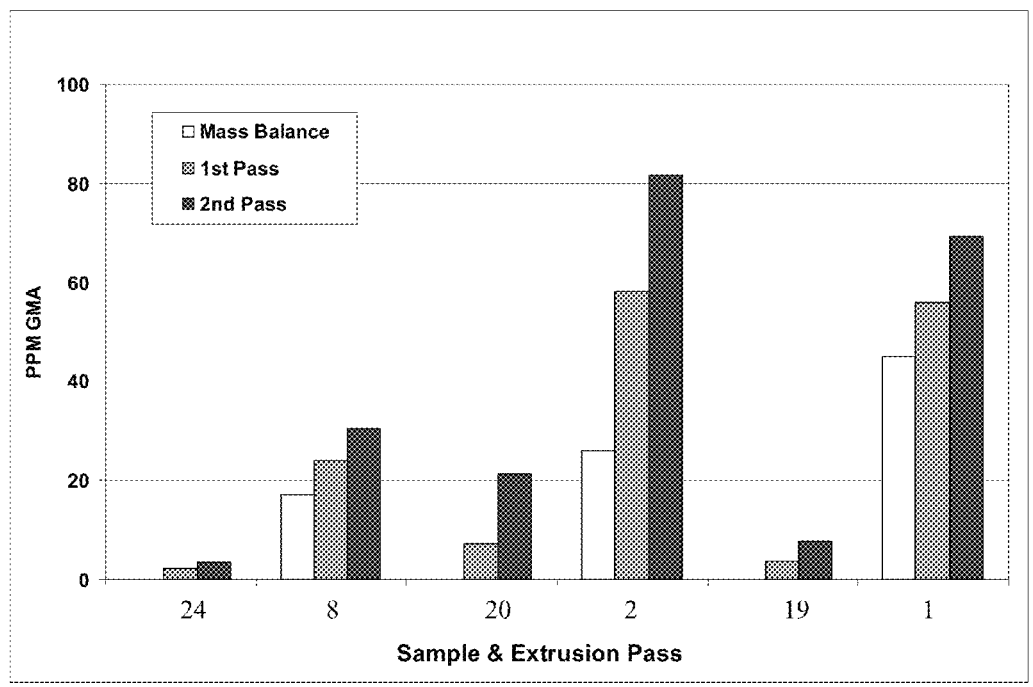
FIG. 8 is a graph of GMA monomer from 1 wt % compounding in PLA based the mass balance and after the first and second passes through an extruder, according to the examples.

The first and second pass materials were then analyzed for styrene and GMA monomers as follows. The pellets were dissolved in dichloromethane and analyzed using GC-MS against several calibrating solutions of styrene and GMA in dichloromethane. The results are given for styrene in FIG. 7 and GMA in FIG. 8, as parts-per-million (PPM) based on mass. Anything above the amount of monomer that would be expected from the mass balance, based on the residuals for the high temperature processes of Example 1 (Samples 1 and 2), represents the net amount of monomer generated by the high-temperature processing. FIG. 7 clearly shows less styrene generation for the "hydrogenated" Example 3 (Samples 19, 20 and 24) resins. FIG. 7 also shows the added benefit of hydrogenation of removing all starting residual monomer. The additional clean-up of the resin by hydrogenation, and its impact on GMA content is exhibited in FIG. 8.

The molecular weight of the chain-extended PLA was assessed by GPC (Gel-Permeation Chromatography). The samples were dissolved in THF and injected into the flow-column and calibrated against polystyrene standards, with the results given in Table 4. The PLA itself starts off with a number average molecular weight, Mn, and weight-average molecular weight, Mw, of about 100 and 200 kiloDaltons (kD), respectively. The table shows clear evidence for chain-extension. The data shows somewhat lower values for Mw on the first pass, with comparable second-pass values, for the hydrogenated resins, is that the trends reflect a slight decrease in epoxy content—as a result of hydrogenation—but better thermal stability.

TABLE 4

Mw and Mn for Chain-Extended PLA

| Sample | kD (First Pass) | | kD (Second Pass) | |
| --- | --- | --- | --- | --- |
| | Mw | Mn | Mw | Mn |
| 1 | 282 | 142 | 309 | 148 |
| 19 | 223 | 115 | 317 | 141 |
| 2 | 268 | 131 | 309 | 144 |
| 20 | 240 | 122 | 318 | 144 |
| 8 | 247 | 132 | 271 | 136 |
| 24 | 223 | 120 | 249 | 124 |

Figure 9:
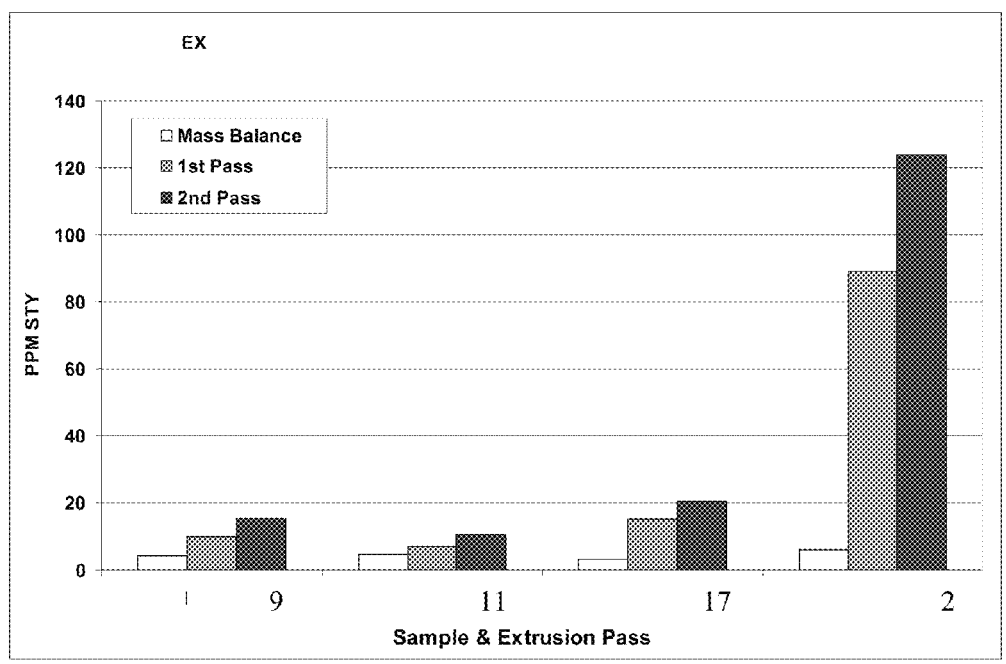
FIG. 9 is a graph of styrene monomer from 1 wt % compounding in PLA low temperature resins, based the mass balance and after the first and second passes through an extruder, according to the examples.
Figure 10:
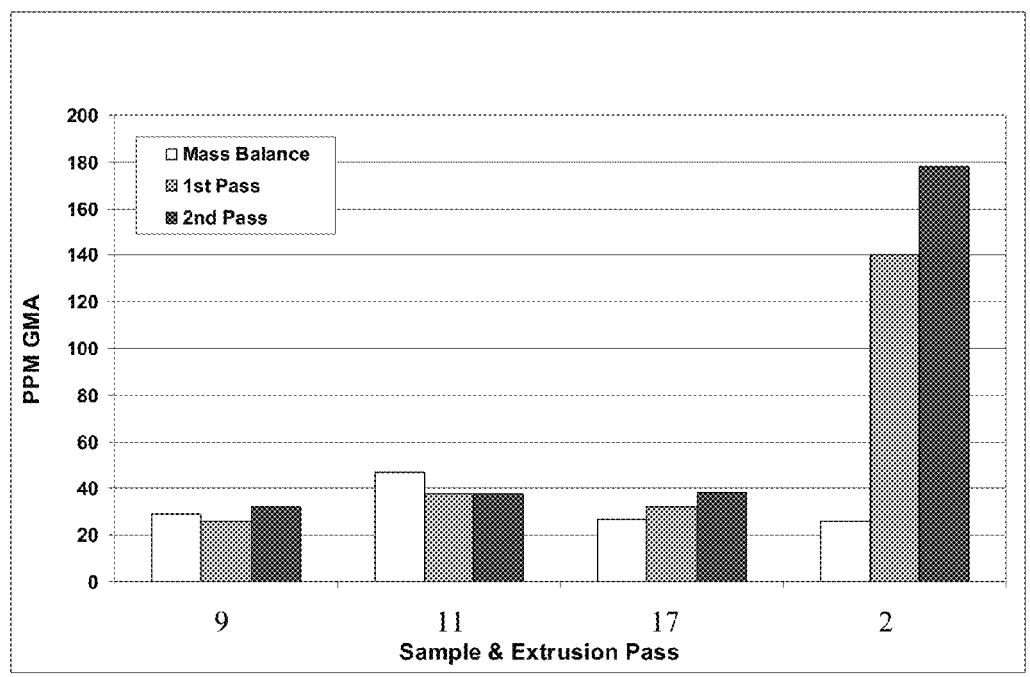
FIG. 10 is a graph of GMA monomer from 1 wt % compounding in PLA low temperature resins, based the mass balance and after the first and second passes through an extruder, according to the examples.

A similar Brabender study was undertaken utilizing the control resin, Example 2, and the three "low temperature" resins, Examples 9 and 11 and 17. The results, given in PPM again, in comparison to Samples 2 are presented in FIG. 9 for styrene and FIG. 10 for GMA. FIG. 10 illustrates an interesting principle: when the resin is very thermally stable, less monomer can be measured in the final article (PLA) than that calculated based on the mass balance of the starting resin. This is due to the simple fact that the total amount of GMA which is reacted (via simple acid-group end-capping), plus any volatilization losses, exceeds any produced GMA.

Example 8

Chain-Extension in Polyethylene Terephthalate (PET)

Figure 11:
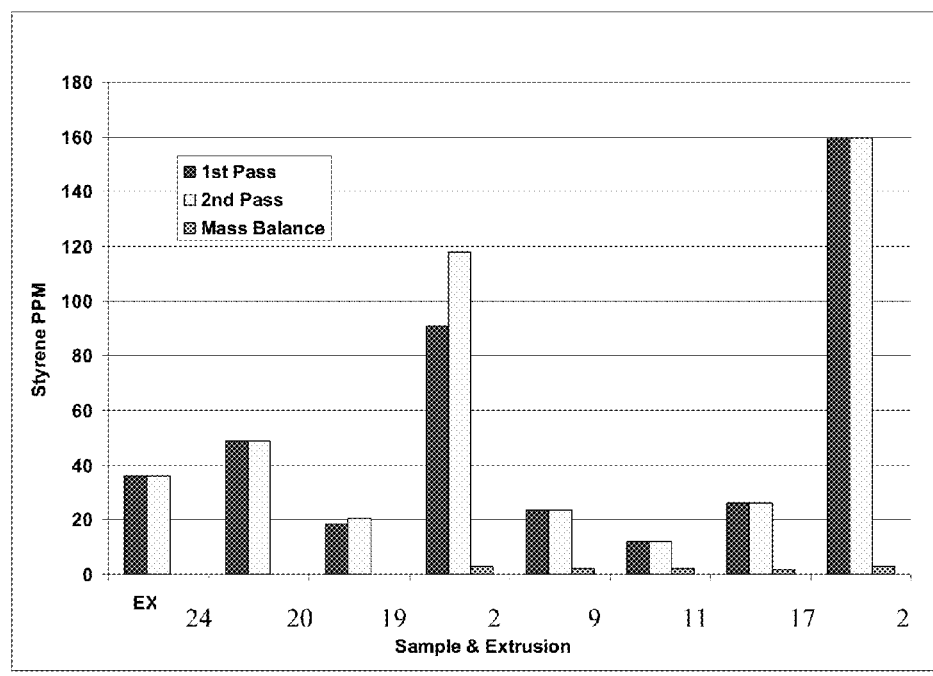
FIG. 11 is a graph of styrene monomer from 0.5 wt % compounding in PET, based the mass balance and after the first and second passes through an extruder, according to the examples.

The three hydrogenated resins, Samples 19, 20, and 24, along with three "low-temperature" resins, Examples 9, 11, and 17 were also compounded in PET (9921, Eastman Corp.) at a resin loading of 0.5 wt %, in two separate studies. In each case, the control resin, Sample 2 was also compounded. Conditions were chosen to mimic typical PET chain-extension conditions. The materials were dry-blended, flood-fed and extruded into pellets using a Brabender conical twin-screw extruder. The peak-processing temperature was 280° C. and the residence time was about 90 seconds. Some material was taken (a first pass), with the remainder sent back through the extruder for a second pass. The results for styrene monomer, expresses in PPM, in the samples taken after both the first and second passes are shown in FIG. 11.

Example 9

Preparation and Testing of Urethane Coatings

In this example, samples from Examples 1 and 2 were formulated into coatings by first dissolving the resins in MAK or butyl acetate to make a "cut" of approximately 60% solids in solvent. To the "cut" was added additional MAK solvent, leveling agent, catalyst and isocyanate. Formulations are shown in Table 5.

The coatings were drawn down onto ACT B1000 CRS panels with a 44 micron wire-wound rod then tested for Gardner dry time and Konig hardness as summarized in Table 5. The results show the coatings made by the low temperature processes have as good, or better, mechanical test properties as compared to coating using materials prepared at the higher, conventional reaction temperatures.

TABLE 5

Formulations Used for Coatings

| Samp. | Resin | Resin (parts) | BA (parts) | MAK (parts) | Cat. (parts) | Lev (parts) | Iso (parts) | GDT1 (hrs) | GDT2 (hrs) | Konig 14 hrs (swings) |
|---|---|---|---|---|---|---|---|---|---|---|
| 25 | 6 | 39.58 | 18.63 | 24.22 | 0.45 | 0.23 | 17.26 | 4.1 | 11.5 | 136 |
| 26 | 7 | 39.35 | 0 | 53.74 | 0.37 | 0.23 | 6.34 | 3.2 | 8.9 | 114 |
| 27 | 12 | 40.56 | 0 | 41.87 | 0.44 | 0.23 | 16.02 | 0.9 | 9.5 | 134 |
| 28 | 13 | 40.07 | 0 | 53.02 | 0.36 | 0.23 | 5.71 | 0.7 | 7.9 | 106 |
| 29 | 14 | 46.37 | 0 | 42.91 | 0.48 | 0.23 | 16.69 | 3.5 | 10.1 | 117 |

Catalyst (Cat) used is dibutyl tin dilaurate at 1% by weight solution in MAK solvent
Isocyanate (Iso) used is Basonat HI 100
Leveling (Lev) additive used is Byk 361N
GRD1 = Gardner dry time Tack Free
GRD2 = Gardner dry time Dry through Weathering Data.

The above coatings were then drawn down onto Aluminum Q panels (A-36 3003 H14 Al) with a 44 micron wireless rod. Prior to applying the coatings, the panels were prepared by coating with a white base coat. The white base coat was prepared by mixing 100 parts of Glasurit L-55 white, 10 parts Glasurit 355-55 activator and 40 parts Glasurit 352-50 reducer then drawing down onto the Q panels with a 44 micron wireless rod and allowed to dry. The coated panels were placed in weathering cabinets and analyzed over time for color change ($\Delta b^*$) and yellowing index parameter ($\Delta YI$). Three cabinets were used. In one cabinet, the panels were exposed to UV-A radiation and in another cabinet UV-B. In the third cabinet, a weatherometer was used. Table 6 shows the results of the changes in b* and the yellowing index parameter over time. The values presented in Table 6 are based upon the CIE 1976 color space (L*, a*, and b*; "Lab" color space) values. In Lab color space, b* values represent the blue-yellow coordinate, and $\Delta b^*$ is a measurement of the change in the blue-yellow coordinate with time (e.g. the different between b* at time 0 and at time, t). Positive changes in $\Delta b^*$ correlate with increased yellowing of a coating with exposure/aging. The YI (or $\Delta YI$ values) set forth in Table 6 represent a change in the yellowing index parameter for a clear or white test sample, over time. Such values are calculated from spectrophotometric data according to method ASTM E 313.

TABLE 6

Weathering Data

| Sample | Time (hr) | UVA $\Delta b^*$ | UVA $\Delta YI$ | UVB $\Delta b^*$ | UVB $\Delta YI$ | Weatherometer $\Delta b^*$ | Weatherometer $\Delta YI$ |
|---|---|---|---|---|---|---|---|
| 25 | 250 | 0.32 | 0.59 | 3.68 | 6.57 | 0.30 | 0.51 |
| 25 | 500 | 0.41 | 0.72 | 4.89 | 8.71 | 0.39 | 0.66 |
| 26 | 250 | 0.16 | 0.24 | 2.21 | 3.91 | −0.02 | −0.15 |
| 26 | 500 | 0.12 | 0.14 | 3.01 | 5.34 | 0.03 | −0.06 |
| 27 | 250 | 0.18 | 0.30 | 2.83 | 5.03 | 0.10 | 0.12 |
| 27 | 500 | 0.13 | 0.21 | 4.15 | 7.39 | 0.13 | 0.15 |
| 28 | 250 | 0.28 | 0.51 | 1.90 | 3.35 | −0.01 | −0.09 |
| 28 | 500 | 0.07 | 0.04 | 2.77 | 4.91 | −0.01 | −0.10 |
| 29 | 250 | −0.05 | −0.12 | 0.48 | 0.82 | −0.13 | −0.28 |
| 29 | 500 | −0.10 | −0.25 | 0.50 | 0.86 | −0.20 | −0.43 |

Figure 12:
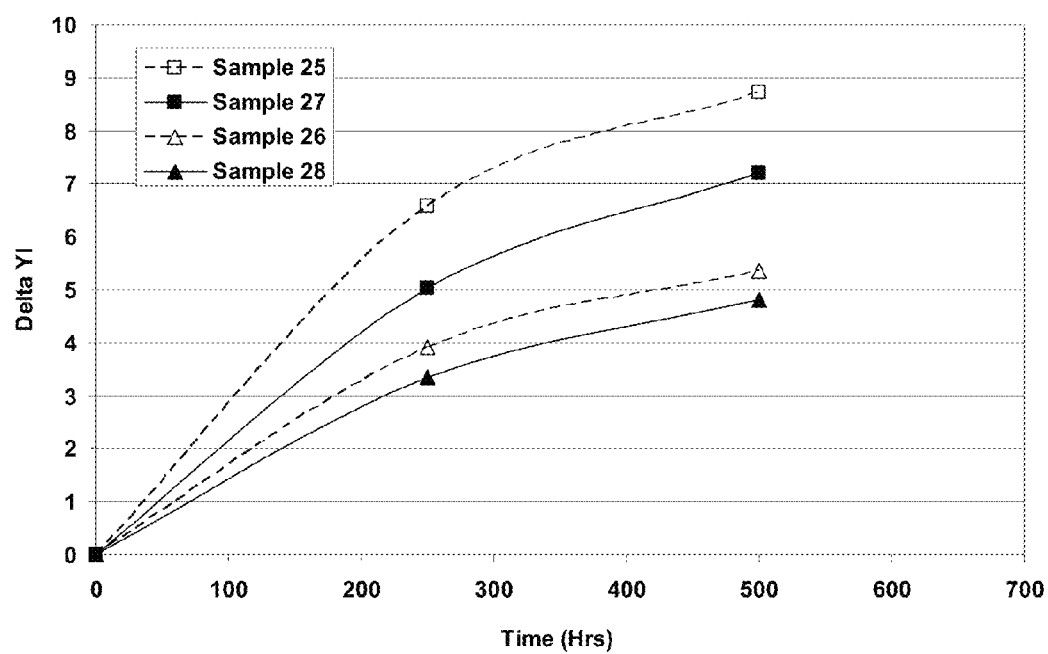
FIG. 12 is a graph of QUV-B exposure of two pairs of samples as a function of the change in yellowing, according to the examples.

FIG. 12 is a graphical representation of the data in Table 6. FIG. 12 shows that the change in yellowing index is significantly lower for samples prepared by low-temperature polymerization.

EQUIVALENTS

The use of the terms "a" and "an" and "the" and similar referents in the context of describing the elements (especially in the context of the following Claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention Claimed. Additionally the phrase "consisting essentially of" will be understood to include those elements specifically recited and those additional elements that do not materially affect the basic and novel characteristics of the Claimed invention. The phrase "consisting of" excludes any element not specifically specified.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended Claims. The present disclosure is to be limited only by the terms of the appended Claims, along with the full scope of equivalents to which such Claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A process for producing a styrenic (meth)acrylic oligomer, the process comprising:
   continuously charging into a reactor a mixture comprising:
   a styrenic monomer;
   a (meth)acrylic monomer; and
   from about 0.25 wt % to about 5 wt % of a polymerization initiator;
   maintaining the mixture at a temperature from about 175° C. to about 300° C.;
   separating a styrenic (meth)acrylic oligomer from the mixture; and
   hydrogenating the styrenic (meth)acrylic oligomer;
   wherein:
   the styrenic (meth)acrylic oligomer has an insubstantial amount of olefinic unsaturation and
   a residence time of the styrenic (meth)acrylic oligomer in the reactor is from about 5 minutes to about 60 minutes.

2. The process of claim 1, wherein the hydrogenating comprises contacting the styrenic (meth)acrylic oligomer with hydrogen and a hydrogenation catalyst.

3. The process of claim 2, wherein the hydrogenation catalyst comprises palladium or platinum.

4. The process of claim 1, wherein the styrenic (meth)acrylic oligomer exhibits an absence of an IR absorption in the range of 1645 $cm^{-1}$ to 1610 $cm^{-1}$.

5. The process of claim 1, wherein the styrenic (meth)acrylic oligomer exhibits an absence of a resonance in the range of 4.5 ppm to 5.5 ppm in the $^1H$ NMR, referenced to tetramethylsilane.

6. The process of claim 1, wherein the polymerization initiator is selected from the group consisting of an azo compound, a peroxide, and a mixture of any two or more thereof.

7. The process of claim 1, wherein the polymerization initiator is selected from the group consisting of 2,2'-azodi-(2,4-dimethylvaleronitrile); 2,2'-azobisisobutyronitrile (AIBN); 2,2'-azobis(2-methylbutyronitrile); 1,1'-azobis(cyclohexane-1-carbonitrile); tertiary butylperbenzoate; tert-amyl peroxy 2-ethylhexyl carbonate; 1,1-bis(tert-amylperoxy)cyclohexane, tert-amylperoxy-2-ethylhexanoate, tert-amylperoxyacetate, tert-butylperoxyacetate, tert-butylperoxybenzoate, 2,5-di-(tert-butylperoxy)-2,5-dimethylhexane, di-tert-amyl peroxide (DTAP); di-tert-butylperoxide (DTBP); lauryl peroxide; dilauryl peroxide, succinic acid peroxide; and benzoyl peroxide.

8. The process of claim 1, wherein the reaction mixture further comprises a reaction solvent.

9. The process of claim 8, wherein the reaction solvent is selected from the group consisting of acetone, ethyl-3-ethoxypropionate, methyl amyl ketone, methylethylketone, methyl-iso-butylketone, N-methyl pyrrolidone, (propylene glycol monomethyl ether acetate, xylene, toluene, ethyl benzene, carbitol, cyclohexanol, dipropylene glycol (mono)methyl ether, n-butanol, n-hexanol, hexyl carbitol, iso-octanol, iso-propanol, methyl cyclohexane methanol, decyl alcohol, lauryl alcohol, myristal alcohol, cetyl alcohol, stearyl alcohol, behenyl alcohol, and isoparaffins.

10. The process of claim 1, wherein the (meth)acrylic monomer is selected from the group consisting of ethyl acrylate, methyl (meth)acrylate, butyl (meth)acrylate, 2-ethylhexyl (meth)acrylate, hydroxyethyl (meth)acrylate, glycidyl (meth)acrylate, acrylic acid, (meth)acrylic acid, hydroxy propyl (meth)acrylate, and hydroxy butyl(meth)acrylate.

11. The process of claim 1, wherein the styrenic monomer comprises styrene or α-methylstyrene.

12. The process of claim 1, wherein the styrenic monomer comprises styrene and the (meth)acrylic monomer comprises glycidyl (meth)acrylate.

13. The process of claim 1, wherein the vinylic monomer comprises from about 40 to about 65 wt % of the styrenic monomer; and from about 35 to about 60 wt % (meth)acrylic monomer.

14. The process of claim 1, wherein the reactor is a continuous stirred tank reactor (CSTR).

15. The process of claim 8, wherein the solvent is present from about 10 wt % to about 40 wt %.

* * * * *